United States Patent [19]
Phillips et al.

[11] Patent Number: 5,682,069
[45] Date of Patent: Oct. 28, 1997

[54] CONCENTRICALLY MOUNTED VIBRATION ATTENUATOR AND METHOD

[75] Inventors: Douglas J. Phillips, Melbourne; Gerry Edward Riveros; Clark Allen Updike, both of Indialantic; Chuck McElwee, Palm Bay, all of Fla.

[73] Assignee: Harris Corporation, Melbourne, Fla.

[21] Appl. No.: 297,861

[22] Filed: Aug. 30, 1994

[51] Int. Cl.⁶ .................................................. H02K 7/08
[52] U.S. Cl. .................................... 310/51; 318/128
[58] Field of Search ........................ 310/51, 12–15; 318/128

[56] References Cited

U.S. PATENT DOCUMENTS

| | | | |
|---|---|---|---|
| 3,078,737 | 2/1963 | McGavern | 310/51 |
| 3,226,579 | 12/1965 | Bygdnes | 310/51 |
| 3,512,022 | 5/1970 | Gilbert | 310/51 |
| 3,786,694 | 1/1974 | Willeitner | 310/51 X |
| 3,957,162 | 5/1976 | Soderqvist | 310/328 X |
| 4,083,433 | 4/1978 | Geohegan, Jr. et al. | 310/51 X |
| 4,635,892 | 1/1987 | Baker | 248/550 |
| 4,710,656 | 12/1987 | Studer | 310/51 |
| 4,922,159 | 5/1990 | Phillips et al. | 318/128 |
| 4,959,568 | 9/1990 | Stokes | 310/51 |
| 4,963,804 | 10/1990 | Geiger | 318/460 |
| 5,126,641 | 6/1992 | Putman et al. | 318/128 |
| 5,185,543 | 2/1993 | Tebbe | 310/51 X |
| 5,231,336 | 7/1993 | van Namen | 318/128 |
| 5,251,863 | 10/1993 | Gossman et al. | 248/550 |
| 5,327,061 | 7/1994 | Gullapalli | 318/649 |
| 5,369,348 | 11/1994 | Gennesseaux | 318/623 |
| 5,394,044 | 2/1995 | Yamamura | 310/51 X |
| 5,397,949 | 3/1995 | Guardiani | 310/51 |
| 5,456,341 | 10/1995 | Garnjost et al. | 188/378 |
| 5,481,142 | 1/1996 | James et al. | 310/51 |
| 5,491,598 | 2/1996 | Stricklin et al. | 310/51 X |
| 5,504,381 | 4/1996 | Kato | 310/51 |

*Primary Examiner*—Mark O. Budd
*Attorney, Agent, or Firm*—Rogers & Killeen

[57] ABSTRACT

A method of attenuating vibrations, and a vibration attenuating actuator for attachment to a vibration transmitting structural member include an annular proof mass for attenuating vibrations. The proof mass is concentrically mounted without bearings on the strut so as to attenuate vibrations being transmitted therethrough without imparting a moment to the strut, and without affecting the structural integrity of the strut. The annular proof mass is moved parallel to the strut's longitudinal axis so that the actuator imparts a vibration attenuating force coaxial with the strut's longitudinal axis. The actuator may be used with feedforward and feedback controllers.

29 Claims, 3 Drawing Sheets

CONCENTRICALLY MOUNTED VIBRATION ATTENUATOR AND METHOD

BACKGROUND OF THE INVENTION

The present invention relates to devices and methods for suppressing a force being transmitted through a strut, and more particularly, to an actuator and method in which a proof mass for attenuating vibrations is concentrically mounted on the strut so as to attenuate vibrations without imparting a moment to the strut.

The term "strut" as used herein refers to any structural member (e.g., beam, bar, arm, support, stay, etc.) that may transmit a vibration along its length during use, such as a structural member connecting vibration producing machinery and vibration sensitive sensors in space vehicles. A strut may have any shape, with cylindrical being common.

The vibrations of interest herein typically have an amplitude of a quarter inch or less or a frequency of 10 Hz to 300 Hz, although vibrations of larger amplitude and other frequencies can be attenuated with the invention. Of particular interest are vibrations that are found in gravity-free environments where actuators (active vibration attenuating devices) are required because passive shock absorbers (those with springs) will not operate.

The need to attenuate vibrations being transmitted through a strut in which unnecessary motion is desirably avoided is well known, and discussed, for example, in U.S. Pat. No. 4,922,159 that issued May 1, 1990 to Phillips, et al. and is assigned to the assignee hereof, and U.S. Pat. No. 5,231,336 issued Jul. 27, 1993 to van Namen. Various methods and devices for attenuating transmitted vibration are known, each with its own advantages. However, these methods and devices have a common disadvantage in that they may introduce further undesirable motion because the vibration attenuating force is not applied along the axis of the strut. As illustrated in FIG. 1, the attenuating force in prior art devices (shown by the arrows) is applied by an actuator 10 that is not on the longitudinal axis 12 of the strut 14. When the attenuating force is applied, a moment is also imparted that may introduce a new, unwanted motion. The location of a strut's longitudinal axis depends on its cross section and is generally defined as a locus of centers of gravity of lateral cross sections. In cylindrical struts, the longitudinal axis extends through the center of the strut.

Another disadvantage of many prior art devices is that they have components that may introduce non-linearities during device operation. Non-linearities may be caused by bearings between moving parts that introduce precision-reducing distortion (e.g., the bearings may be out-of-round, bearing friction), and by non-linear magnetic circuits. It is desirable to reduce or eliminate such components.

One of the advantages of prior art vibration attenuating actuators such as illustrated in FIG. 1 is that they can be attached to a strut without replacing the strut. That is, there was no need to replace or significantly alter an existing strut. It is desirable to maintain this feature in an actuator that does not impart a moment to the strut.

Accordingly, it is an object of the present invention to provide a novel actuator and method for attenuating a strut's longitudinal vibration that obviates the problems of the prior art.

It is another object of the present invention to provide a novel actuator and method for attenuating a strut's longitudinal vibration that does not impart a moment to the strut.

It is yet another object of the present invention to provide a novel bearingless actuator that does not impart a moment to the strut and that does not require replacement or significant structural modification of the strut.

It is still another object of the present invention to provide a novel actuator and method for attenuating vibration in which a proof mass is concentrically mounted on a strut without bearing so as to avoid imparting a moment to the strut and to avoid introducing non-linearities.

It is a further object of the present invention to provide a novel actuator and method for attenuating vibration in which a proof mass is carried external to the strut and imparts a force opposing vibration that is coaxial with the longitudinal axis of the strut.

It is yet a further object of the present invention to provide a novel actuator and method for attenuating vibration in which a removably attachable clamp is affixed to a strut, and in which an annular proof mass is flexibly carried by the clamp to impart a force opposing vibration in the strut.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
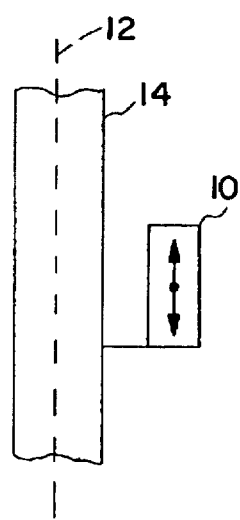
FIG. 1 is a schematic illustration of the application of a vibration attenuating force in the prior art.
Figure 2:
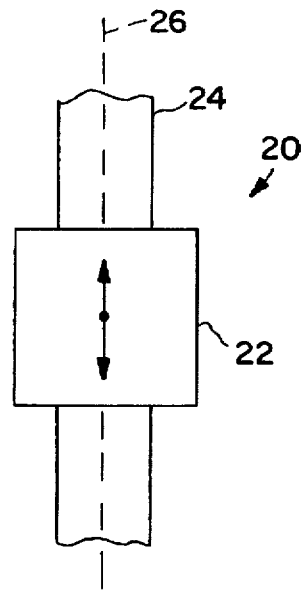
FIG. 2 is a schematic illustration of the application of a vibration attenuating force in the present invention.

With reference now to FIG. 2, an actuator 20 may include an annular proof mass 22 for attenuating vibrations that is concentrically mounted on a strut 24 so as to attenuate vibrations being transmitted therethrough without imparting a moment to the strut. The proof mass 22 is moved longitudinally (parallel to the strut longitudinal axis 26) so that the actuator 20 imparts a vibration attenuating force (shown by the arrows) coaxial with the strut's longitudinal axis 26. The strut 24 may have any shape, with cylindrical being illustrated by way of example.

Figure 3:
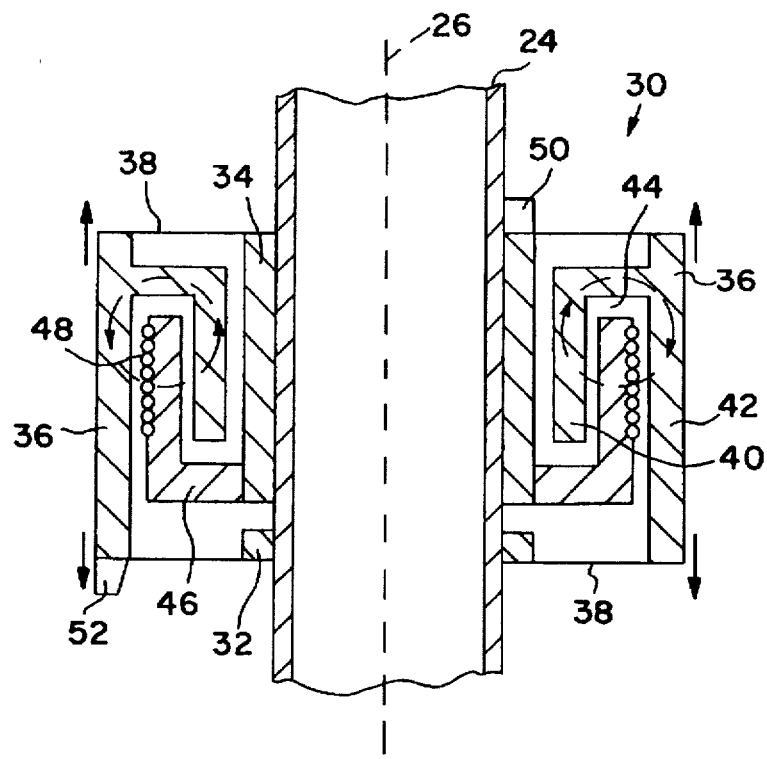
FIG. 3 is a vertical cross section of an embodiment of the present invention.

With reference now to FIG. 3, an actuator 30 may include one or more clamps 32 and 34 that are affixed to the strut 24 so that the clamps and the strut move together. The clamps 32 and 34 may be removably attachable to the strut and to this end may include conventional mounting hardware. A proof mass 36 may be flexibly attached to one or more of the clamps 32 and 34 with flexible members 38. The proof mass 36 may be annular with a center opening that receives, but does not contact, the strut 24 and clamps 32 and 34. The flexible members 38 may be annular with a center opening that receives the strut 24. The proof mass 36 may be attached to the outer periphery of flexible members 38, and the clamps 32 and 34 may be attached to the inner periphery of flexible members 38 so that the proof mass 36 can move in directions parallel to the longitudinal axis 26 of the strut 24 (such as indicated by the four up and down arrows at the ends of the proof mass.) The flexible members 38 restrain the movement of the proof mass and transmit the force generated by proof mass movement to the strut. The flexible members 38 may support the proof mass 36 both longitudinally and laterally without the need for bearings between the proof mass 36 and the strut 24. Because the proof mass is concentric to the strut's longitudinal axis 26, the force from the proof mass 36 that has been transmitted by the flexible members 38 is imparted along the axis 26.

Movement of the proof mass 36 may be generated using conventional techniques, although a magnetic field is preferred. The proof mass 36 may include two annular walls 40 and 42 forming an annular opening 44 therebetween. One of the clamps 32 and 34 may include a bobbin 46 for a wire that is coiled around the bobbin 46 to form a magnetic coil 48. The bobbin 46 fits into the opening 44 so that the magnetic coil 48 is between the walls 40 and 42. The bobbin 46 may be part of one of the clamps 32 and 34 or attached thereto. When a drive current is provided to the magnetic coil 48, a magnetic field is formed (flux lines of that field being illustrated in FIG. 3 by the dashed loop) that causes the proof mass 36 to move longitudinally as restrained by the flexible members 38.

The drive current for generating the magnetic field may be provided in a conventional manner, such as the rate feedback method disclosed in U.S. Pat. No. 4,922,159 that is incorporated by reference. As discussed therein, a first accelerometer may be used to sense the velocity of the strut, and information from that accelerometer may be used in a circuit that pulses a drive current for the magnetic coil at a rate needed to attenuate the vibrations. A second accelerometer may provide a direct measure of the force imparted by the proof mass to the strut. In an embodiment of the present invention, a first accelerometer 50 may be carried by the strut 24 or by one of the clamps 32 and 34 or by another clamp mounted on the strut and provided for this purpose. A second accelerometer 52 may be carried by the proof mass 36 in a manner appropriate for the strut on which the actuator 30 is mounted. The circuit (not shown) for pulsing the drive current may be carried on the strut, or elsewhere as appropriate for the particular installation. The magnetic field drive current may also be provided with a conventional feedforward cancellation method.

Figure 4:
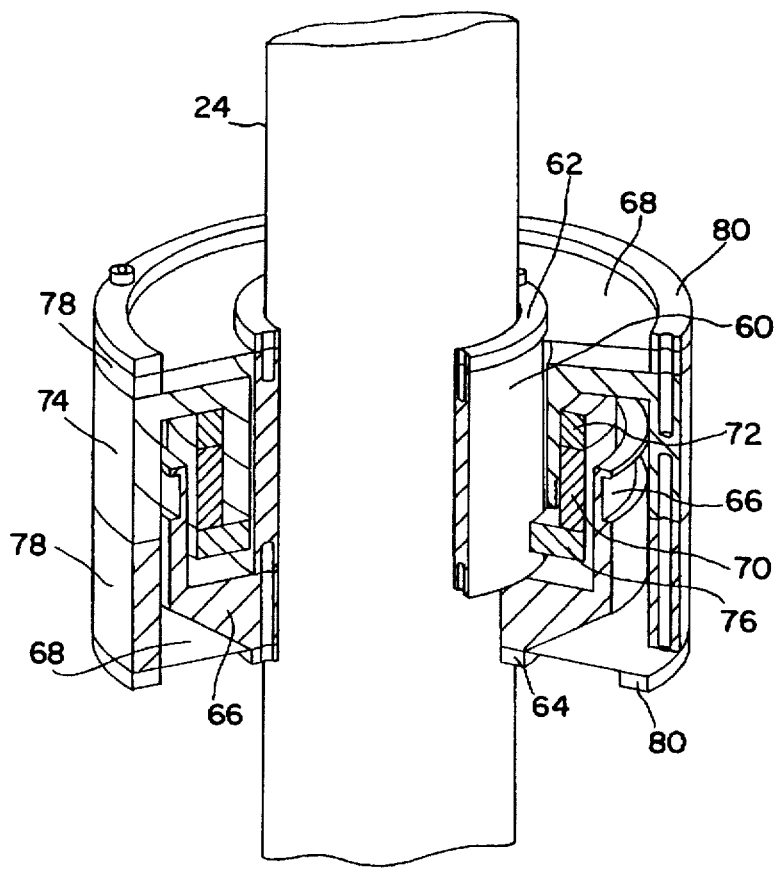
FIG. 4 is a cutaway illustration of a preferred embodiment of the present invention.

With reference now to FIG. 4, in a preferred embodiment the various elements discussed above may be modified for improved response to the magnetic field or for ease of manufacture. The clamp for the strut 24 may include an aluminum collar 60 and aluminum caps 62 and 64 that will hold the flexible member in place. A bobbin 66 made of Delrin may be affixed to the collar 60 and cap 64 so that the bobbin moves with the strut. Annular flexible members 68 made of graphite may have their inner peripheries held in place on the strut with the caps 62 and 64. The annular proof mass may include a magnet 70 of magnetic material such as neodymium-iron-boron, an magnetic spacer 72 of aluminum, a pole piece 74 of magnetic iron, and a proof mass cap 76 of aluminum. Aluminum spacers 78 may be added to the proof mass to extend it to the flexible members 68. The flexible members 68 may be attached to the proof mass with aluminum caps 80. Other materials may be used as appropriate.

Figure 5:
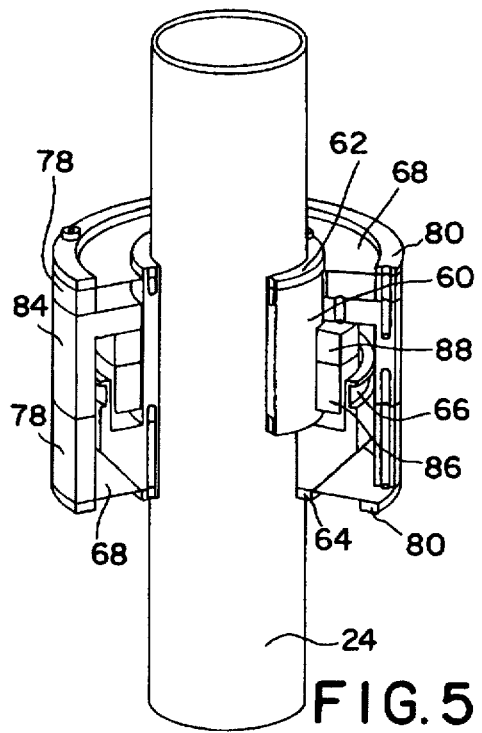
FIG. 5 is a cutaway illustration of another embodiment of the present invention illustrating a different proof mass.

In another preferred embodiment, the number and complexity of components in the proof mass may be reduced. With reference to FIG. 5 in which the element numbers of FIG. 4 have been retained on similar elements in the interest of clarity, the elements 70–76 of the proof mass of FIG. 4 may be replaced, for example, with a magnetic iron outer pole 84, a magnetic iron inner pole 86, and a neodymium-iron-boron disc magnet 88.

Figure 6:
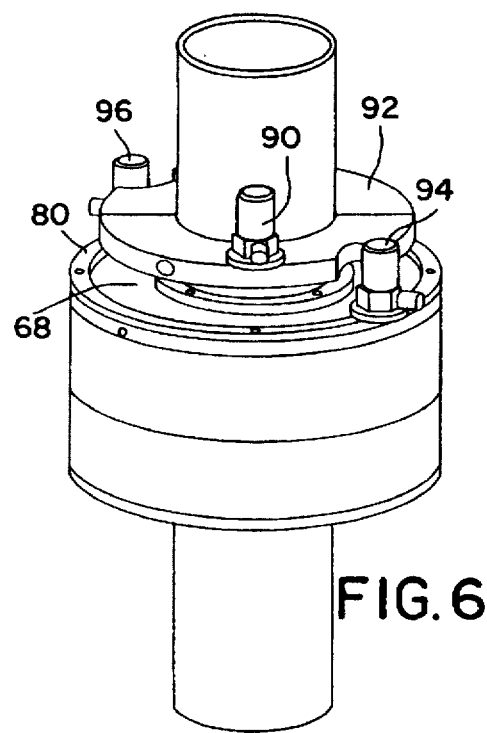
FIG. 6 is a pictorial depiction of the exterior of a preferred embodiment illustrating an exemplary accelerometer placement.

In the embodiments discussed above the accelerometers for sensing strut and proof mass motion may be carried in the manner illustrated in FIG. 6. Accelerometer 90 for sensing strut motion may be mounted on a platform 92 affixed to the strut. A backup accelerometer may be provided if needed. Accelerometer 94 for sensing proof mass motion may be mounted on the cap 80 that connects the flexible member 68 to the proof mass. A backup accelerometer 96 may be provided if needed.

Figure 7:
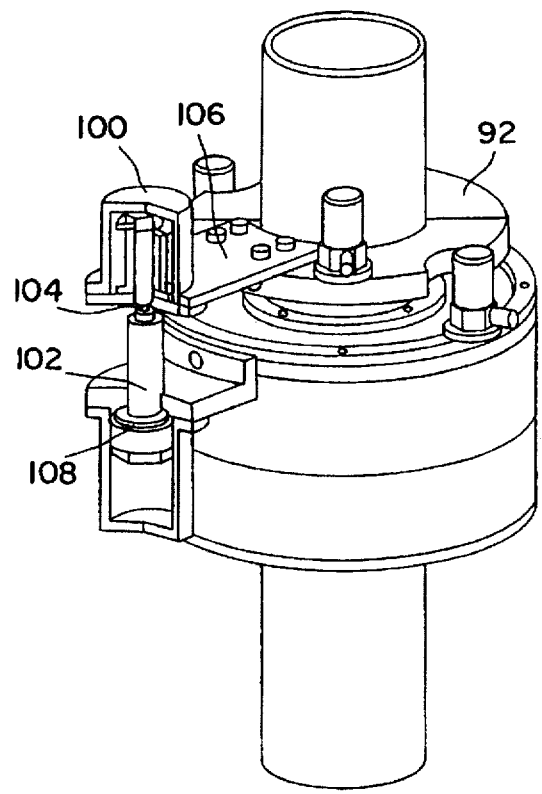
FIG. 7 is a pictorial depiction of a preferred embodiment illustrating an exemplary single-use restraining mechanism.

The actuator of the present invention may be operated continuously, or it may be desirable to have it inoperative until turned on (e.g., after the space craft in which it is used is established in orbit), or to have the capability to turn it off and on. In any event, when the actuator is not operating, the proof mass is desirably restrained to prevent damage to the actuator. With reference to FIG. 7, a single-use restraint 100 (shown in cutaway view) may include a breakable bolt 102 (such as a Frangibolt) that is fractured at its notch 104 when the actuator is to be operated. The bolt affixes the proof mass to the strut (e.g., through bracket 106 and the mounting plate 92 for the accelerometers. When the bolt is fractured, a spring 108 (shown compressed) expands to retract the fractured bolt section, thereby freeing the proof mass and allowing operation of the actuator.

Figure 8:
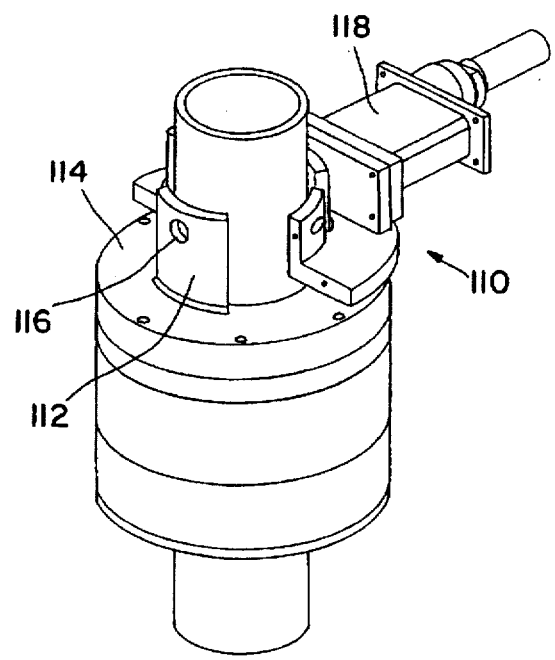
FIG. 8 is a pictorial depiction of a preferred embodiment illustrating an exemplary reusable restraining mechanism.

With reference now to FIG. 8 a reusable restraint 110 may include plates 112 that move with the proof mass (e.g., by means of a cover 114 connected to the proof mass.) The plates 112 include an aperture 116 that may be in registration with a corresponding aperture in the strut when the proof mass is at rest. When the actuator is to be turned off, a device 118 extends a pin through the apertures to prevent the proof mass from moving relative to the strut. The pin may be retracted as needed to permit operation of the actuator. The device 118 may be any suitable mechanism that will repeatedly extend and retract a pin on command, with a IH-5055 High Output Paraffin Linear Motor from Starsys Research Corp. of Boulder, Colo. being preferred.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. An actuator for attenuating longitudinal vibrations in a strut having a longitudinal axis, said actuator comprising:
   a proof mass that is concentric with the strut's longitudinal axis so as to avoid producing a moment during operation of said actuator;
   a clamp removably attached to the exterior of the strut; and
   a flexible member affixed to said clamp and said proof mass for allowing said proof mass to move longitudinally relative to said clamp.

2. The actuator of claim 1 wherein said proof mass is carried external to the strut.

3. The actuator of claim 1 wherein said clamp is generally cylindrical and said flexible member is disc-shaped.

4. The system of claim 1 further comprising means external to the strut for causing a reactive motion of said proof mass that imparts a force along the strut's longitudinal axis that tends to attenuate vibration of the strut during operation of said system.

5. The system of claim 4 wherein said means for causing a reactive motion comprises a magnetic coil around the periphery of the strut for generating a magnetic field, the magnetic field causing the reactive motion of said proof mass.

6. A system for actively attenuating longitudinal vibrations in a strut with a longitudinal axis, said system comprising a cylindrical proof mass which extends around the exterior of the strut for imparting a longitudinal force opposing longitudinal vibration of the strut, the force being imparted coaxially with the longitudinal axis of the strut.

7. The system of claim 6 without friction-reducing bearings between said proof mass and said strut.

8. The system of claim 6 further comprising a flexible member connecting the strut and said proof mass to allow motion of said proof mass longitudinally relative to the strut.

9. The system of claim 8 wherein said proof mass is generally cylindrical and said flexible member is affixed to an end thereof.

10. The system of claim 6 further comprising means for imparting motion to said proof mass, the motion of said proof mass imparting the force opposing longitudinal vibration of the strut, and wherein said proof mass comprises two annular walls with an annular opening therebetween, and wherein said means for imparting motion comprises a magnetic coil which fits into said annular opening and moves with the strut, said coil for generating a magnetic field which causes the motion of said proof mass.

11. A vibration control actuator for a actively attenuating longitudinal vibration of a strut comprising:

a clamp removably attached to the exterior of the strut;

a proof mass extending about the periphery of the strut;

a flexible member affixed to said clamp and said proof mass for allowing said proof mass to move longitudinally relative to said clamp;

a first accelerometer connected to said strut for determining vibration of the strut; and a magnetic coil affixed to said clamp for imparting motion to said proof mass responsive to vibration determined by said first accelerometer, the motion of said proof mass imparting a force at the center of the strut tending to attenuate the vibration of the strut.

12. The actuator of claim 11 further comprising a second accelerometer connected to said proof mass for measuring a force imparted by said proof mass to said strut.

13. The actuator of claim 11 wherein said clamp and said proof mass are generally cylindrical, said proof mass being radially exterior to said clamp.

14. The actuator of claim 13 wherein said flexible member is annular with an exterior periphery affixed to said proof mass and an interior periphery affixed to said clamp.

15. The actuator of claim 14 further comprising a second accelerometer connected to said exterior periphery of said flexible member for determining vibration of said proof mass.

16. The actuator of claim 11 further comprising a mounting plate affixed to the strut for carrying said first accelerator.

17. The actuator of claim 11 without bearings for facilitating movement of said proof mass.

18. A longitudinal vibration attenuating device for a strut comprising a clamp that is removably attached to the strut, and an annular proof mass flexibly affixed to said clamp external to the strut for allowing said proof mass to move longitudinally relative to said clamp to impart a longitudinal vibration attenuating force internal to the strut.

19. A method of actively damping longitudinal vibration in a strut comprising the steps of:

imparting a longitudinal vibration damping motion to a proof mass that surrounds the strut so that a force is felt at the center of the strut tending to attenuate the longitudinal vibration of the strut; and reducing distortion by attaching the proof mass to the strut with a flexible member that maintains separation between the proof mass and the strut.

20. The method of claim 19 further comprising the step of providing a magnetic field for causing motion of the proof mass during operation of the actuator.

21. The method of claim 19 further comprising the step of removably attached a clamp to the exterior of the strut, and affixing the flexible member to the clamp and to the proof mass to allow the proof mass to move longitudinally relative to said clamp.

22. A method of attenuating longitudinal vibration of a strut comprising the steps of:

removably attaching a clamp to the exterior of the strut;

providing a proof mass that extends about the periphery of the strut;

connecting the clamp and the proof mass with a flexible member that allows the proof mass to move longitudinally relative to the clamp;

determining vibration of the strut with a first accelerometer connected to the strut; and imparting motion to the proof mass responsive to vibration determined by the first accelerometer, the motion of the proof mass imparting a force at the center of the strut tending to attenuate the vibration of the strut.

23. An actuator for attenuating longitudinal vibrations in a member having a longitudinal axis, said actuator comprising:

a proof mass for attenuating the longitudinal vibrations that is concentric with the member's longitudinal axis so as to avoid producing a moment during operation of said actuator in the presence of the longitudinal vibrations; and a clamp removably attached to the member; and means affixed between said clamp and said proof mass for allowing said proof mass to move longitudinally relative to said clamp to attenuate the longitudinal vibrations.

24. The actuator of claim 23 wherein said means comprises a flexible disc connecting the strut and said proof mass to allow motion of said proof mass longitudinally relative to the member.

25. The actuator of claim 23 further comprising active means external to the member for causing a reactive motion of said proof mass that imparts a force along the member's longitudinal axis that tends to attenuate longitudinal vibration of the member during operation of said actuator.

26. The actuator of claim 25 wherein said active means comprises a magnetic coil around the periphery of the member for generating a magnetic field, the magnetic field causing the reactive motion of said proof mass.

27. The device of claim 18 wherein said clamp and said proof mass are generally cylindrical, said proof mass being radially exterior to said clamp.

28. The device of claim 18 wherein said proof mass comprises two annular walls with an annular opening therebetween, and wherein said clamp comprises a bobbin for a magnetic coil which fits into said annular opening.

29. The actuator of claim 11 wherein said proof mass comprises two annular walls with an annular opening therebetween, and wherein said clamp comprises a bobbin for said magnetic coil which fits into said annular opening.

* * * * *